June 17, 1941.  R. T. OSMAN  2,246,220
TRAILER SCOOP
Filed May 4, 1938  4 Sheets-Sheet 1

INVENTOR
RALPH T. OSMAN
BY
ATTORNEYS

June 17, 1941.　　　R. T. OSMAN　　　2,246,220
TRAILER SCOOP
Filed May 4, 1938　　　4 Sheets-Sheet 4

INVENTOR
RALPH T. OSMAN
BY
ATTORNEYS

Patented June 17, 1941

2,246,220

UNITED STATES PATENT OFFICE 2,246,220

TRAILER SCOOP

Ralph T. Osman, Milwaukee, Wis.

Application May 4, 1938, Serial No. 205,903

5 Claims. (Cl. 37—129)

This invention appertains to trailer scoops, and more particularly to tractor-drawn scoops designed to dig, carry, dump, and spread dirt, gravel, and the like.

One of the primary objects of my present invention is to provide a trailer scoop which can be connected directly to a tractor by means of a fifth wheel, whereby to eliminate the usual drawbar connections, and thereby give a compact structure for operating in confined spaces, and one in which a part of the weight of the trailer scoop is effectively supported by the tractor, and whereby the controls for the scoop can be conveniently arranged and easily actuated by the operator of the tractor.

Another salient object of my invention is to provide an exceedingly simple, inexpensive, and efficient trailer scoop provided with power control.

Incidental to the foregoing, a more specific object of my invention is to provide a trailer scoop in which control of the scoop for its various operations is accomplished by a power take-off on the tractor, which is transmitted through the connection between the tractor and trailer scoop to sheaves mounted adjacent the sides of the trailer frame, and connected with the scoop-actuating means through cables.

A further important object of my invention is the provision of novel means for supporting the scoop directly from and solely by rock arms on the trailer frame, with novel means for operating the arms, whereby the bucket or scoop can be advantageously moved into its various operating positions, novel means being provided for bracing the scoop while in its digging or scraping position, and when in its carrying and dumping positions.

A still further object of my invention is to provide a novel and simple control for the scoop or bucket in which the necessity of providing hydraulic jacks, complicated cable controls, and the like is eliminated.

With these and other objects in view, the invention consists in the novel construction, arrangement, and formation of parts, as will be hereinafter more specifically described, claimed, and illustrated in the accompanying drawings, in which drawings:

Referring to the drawings in detail, wherein similar reference characters designate corresponding parts throughout the several views, the letter S generally indicates my improved trailer scoop, and T a tractor for use therewith.

Figure 1:
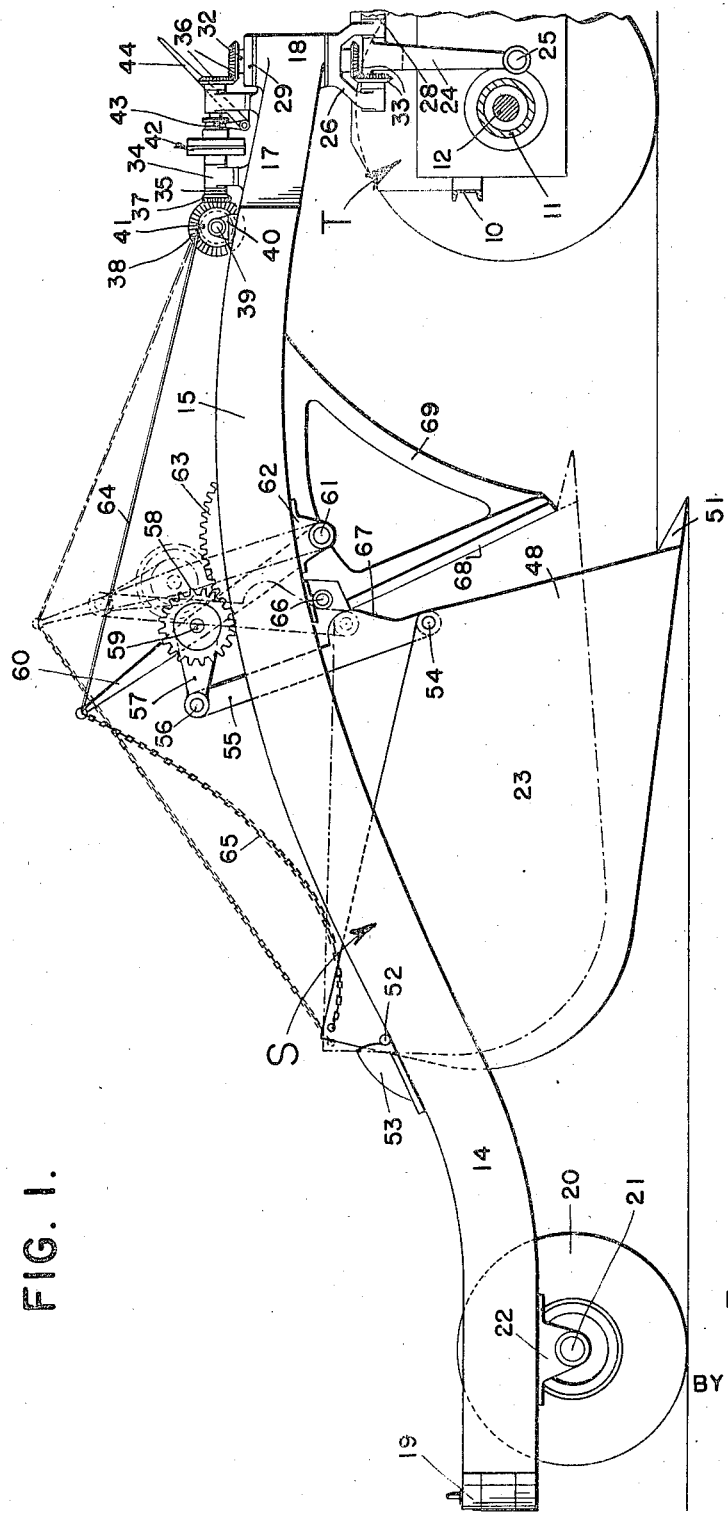
Figure 1 is a side elevational view of my improved trailer scoop, showing the same connected to a tractor, only a fragment of the tractor being shown, the bucket or scoop being illustrated in its digging or scraping position in full lines, and in its carrying position in dotted lines.

The tractor T can be of any preferred construction, and, hence, will not be described in detail, but it is to be noted that the same includes a frame 10 having a rear housing 11 for the drive axle 12. Forwardly of the rear axle 12 is the driver's seat 13. The tractor is provided with a conventional type of power take-off (not shown).

My novel trailer scoop S includes a rugged frame 14, which is shown to consist of a pair of spaced parallel arched side beams 15. The forward ends of the beams are connected together by a front draw-beam 16. This front draw-beam 16 preferably has formed integral therewith at its center the forwardly extending draw-head 17, which is adapted to project over the frame of the tractor T. This head 17 terminates in a vertically disposed bearing sleeve 18, for a purpose which will be set forth later. The rear ends of the side beams 15 are connected by a displaceable rear frame beam 19. This rear frame beam 19 is so arranged that the same can be swung to an out-of-the-way position, whereby access to the rear ground wheels 20 can be easily had. The ground wheels 20 are preferably arranged on stub axles 21, which are carried by bearing brackets 22 supported from the side beams 15.

Mounted for swinging movement between the side arch beams 15 is the bucket or scoop 23. The arrangement and formation of this bucket forms one of the salient features of my invention, and the mounting thereof will be later described in detail.

The trailer scoop frame can be connected to the tractor by a coupling device, which can be the same as or similar to the coupling shown in Patent No. 2,091,009, issued to me August 24, 1937.

Thus, the coupling device includes a bottom, transversely extending U-shaped yoke 24, which is connected at its lower ends by means of pivot pins 25 with the rear axle housing 11 of the tractor. Arranged above the yoke 24 is a second yoke 26, which extends transversely to the yoke 24. The yoke 26 carries the upwardly extending, centrally disposed hollow spindle 27 on which is rotatably mounted the sleeve 18 of the trailer scoop. The arms of the yoke 26 is connected with the upper end of the yoke 24 by means of a rotatable shaft 28. The yoke 26 is free to rock upon said shaft 28. The sleeve 18 is confined against upward movement on its spindle 27 by any preferred means, such as retaining nuts 29. By this construction and arrangement, it can be seen that the trailer scoop is connected with the tractor by a coupling which is of a universal character, and, thus, the trailer scoop is free to turn relative to the tractor and to rock both transversely and longitudinally of the tractor.

The scope 23 is actuated from the power plant of the tractor T in a novel manner, and a part of the operating mechanism is incorporated with the coupling in an advantageous way. Thus, the shaft 28 constitutes the main drive for operating the scoop, and this shaft is connected to the power take-off of the tractor in any desired manner. However, in order to allow movement of the yoke 24, the shaft 28 has incorporated therein universal joints 30 and a slide joint 31.

Rotatably mounted in the hollow spindle 27 is a counter-shaft 32, and this counter-shaft is operatively connected to the main drive shaft 28 by gears 33, which are secured respectively to the shafts 32 and 28. Bearing brackets 34 are mounted upon the draw-head 17, and these brackets rotatably support a longitudinally extending shaft 35. This shaft is in turn operatively connected to the counter-shaft through the medium of intermeshing beveled gears 36 keyed or otherwise secured respectively to the shaft 32 and the shaft 35. The rear end of the shaft 35 has secured thereto a beveled pinion 37, which meshes with a beveled gear 38 keyed or otherwise secured to a transversely extending shaft 39 rotatably mounted in bearing brackets 40 mounted on the side beams 15 of the trailer scoop. The shaft 39, adjacent each beam 15, has rigidly secured thereto cable drums 41, which also constitute a direct part of the mechanism for actuating the scoop.

In order to bring about the operation and the stopping of the drums 41, the shaft 35 has incorporated in the length thereof a clutch brake 42. The movable section of the clutch brake 42 is actuated by means of a yoke 43, which is operatively connected to a hand lever 44. This hand lever 44 extends forwardly over the tractor and terminates adjacent the driver's seat 13, whereby the operator of the tractor can conveniently actuate the same.

Referring back to the scoop or bucket 23, it can be seen that the same includes side plates 48, a bottom plate 49, and a rear wall or plate 50. The front edge of the bottom plate 49 is preferably provided with a cutting or scraping blade, and the same can also be provided with digger teeth 51. Laterally extending stop pins 52 are carried by the side plates 48 of the bucket adjacent the rear upper end thereof, and these pins are adapted to engage against stop brackets or castings 53 rigidly carried by the side beams 15 when the bucket is in its digging or scraping position, as will be more fully understood.

The forward upper corners on the side plates 48 of the bucket have pivotally connected thereto by means of pivot pins 54, rock arms 55. The upper ends of the rock arms are pivotally connected by means of pivot pins 56 with the outer ends of actuating cranks 57. These cranks 57 can be formed on or secured to spur gears 58, which are rotatably mounted on stub shafts 59 carried by the swinging operating levers 60.

The levers 60 are rockably mounted at their lower ends forwardly of the bucket 23 on pivot pins 61. These pivot pins can be carried by brackets 62 bolted or otherwise secured to the lower surface of the arched beams 15. The spur gears 58 mesh with and are adapted to travel over sector gears 63, which are firmly united with the inner faces of the arched beams 15. The extreme upper ends of the operating lever 60 have connected thereto cables 64, which are adapted to be wound off and on the drums 41.

Figure 2:
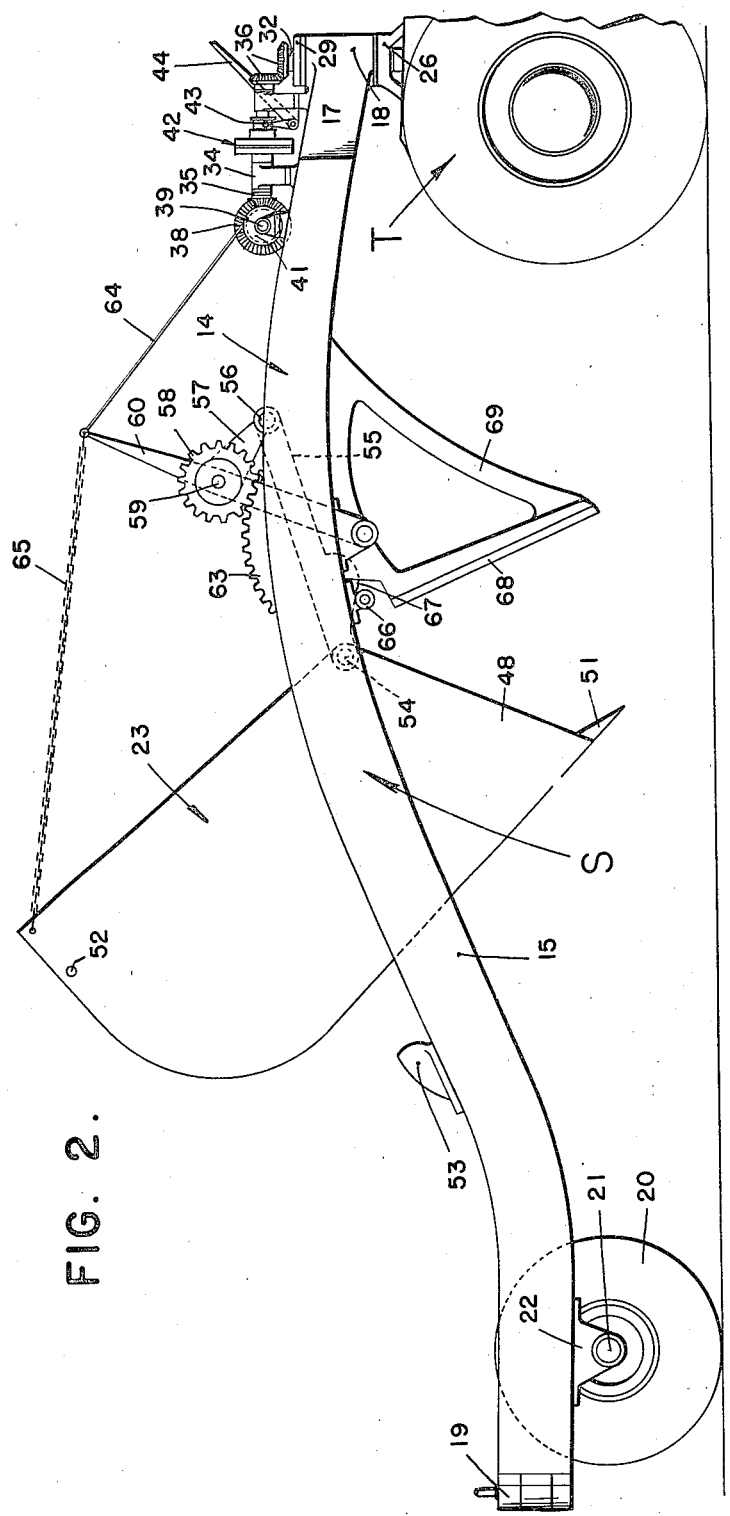
Figure 2 is a view similar to Figure 1, but showing the bucket or scoop in its dumping position.
Figure 3:
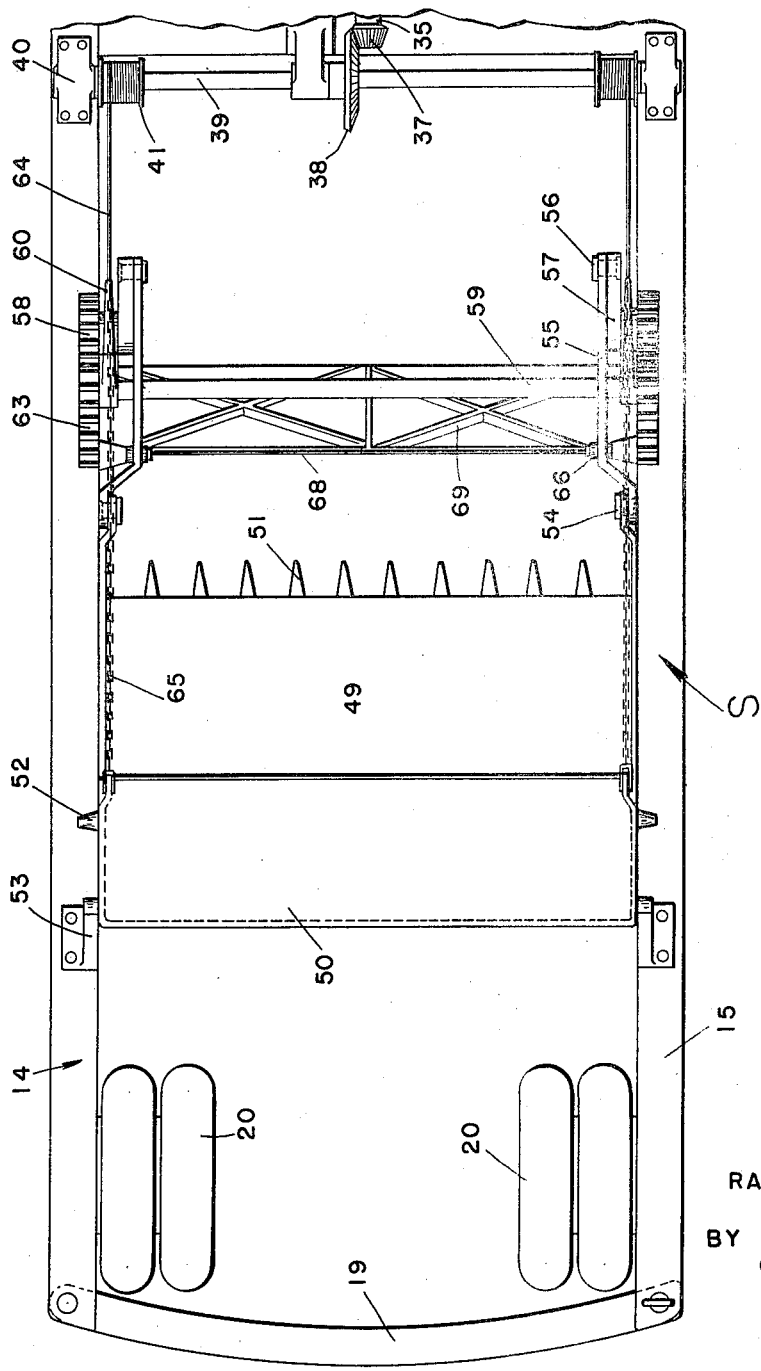
Figure 3 is a fragmentary, top plan view of my improved trailer scoop.
Figure 4:
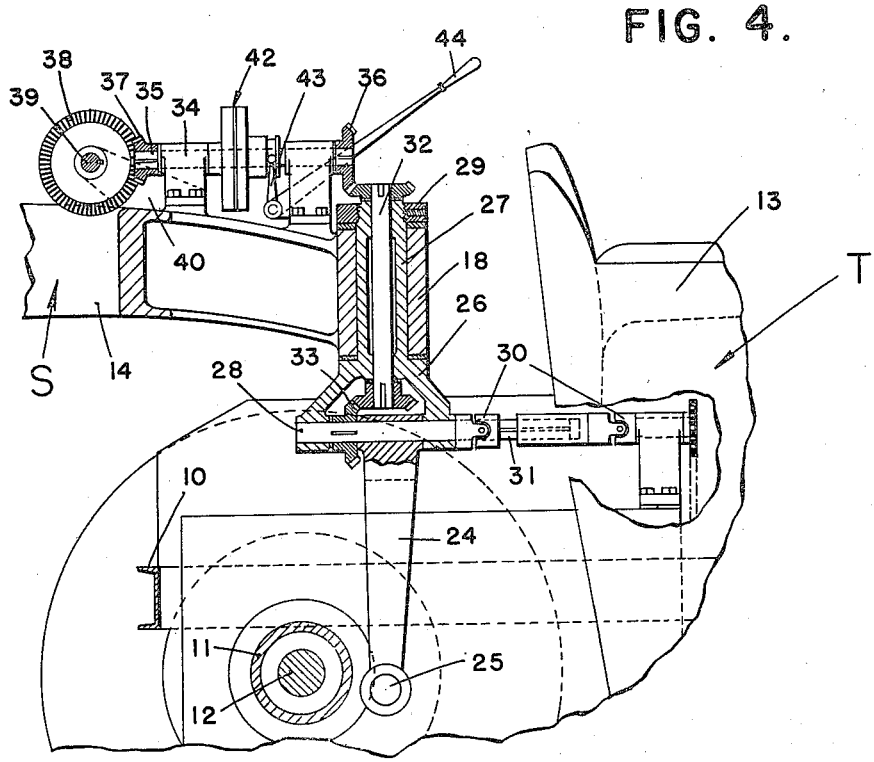
Figure 4 is a central, longitudinal sectional view taken substantially on the line 4—4 of Figure 5, looking in the direction of the arrows, illustrating the novel means employed for actuating the sheaves for the scoop levers from the tractor.
Figure 5:
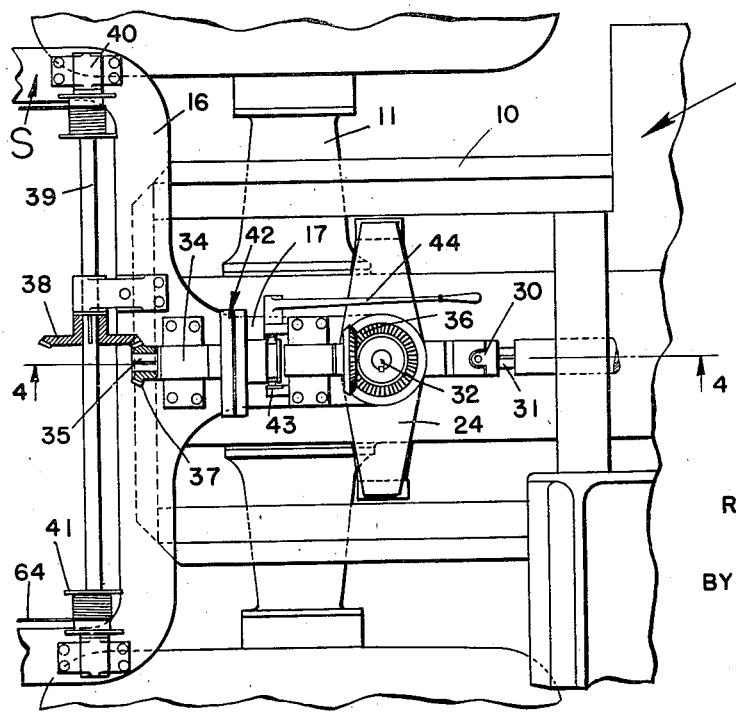
Figure 5 is a fragmentary, top plan view illustrating the connection between the trailer scoop and the tractor, and the means for operating the sheaves from the tractor, parts of the view being shown broken away and in section.

To further aid in operating the bucket or scoop 23, the upper ends of the levers have connected thereto chains or cables 65 which lead rearwardly over the sides of the scoop. The rear ends of the chains 65 are connected to the rear upper corners of the scoop or bucket, as is clearly shown in Figures 1, 2, and 3.

Supporting pins 66 are provided for the bucket when the same is in its carrying position and in its dumping position. These pins are disposed in the path of the rock arms 55, and the rock arms rest upon the pins when the scoop or bucket is in its above-mentioned positions. If desired, protuberances or cams 67 can be formed on the lower faces of the rock arms to aid in elevating the bucket or scoop, as will also be more clearly brought out.

When the scoop or bucket is in its carrying position, it is highly desirable that the earth or other material therein be held against loss. Consequently, a cover plate 68 is provided for the front end of the scoop.

This cover plate extends transversely of the frame of the trailer scoop and is rigidly held in position by suitable castings 69, which are anchored to the frame of the trailer. Thus, the cover 68 is held stationary and does not move relative to the scoop, but the scoop moves into engagement therewith when the scoop is in its carrying position.

In operation of my improved trailer scoop, the same is connected with the trailer in the manner shown and described, and when the trailer is to be used for digging or scraping purposes, the clutch brake 42 is released by the operator, and the bucket or scoop will assume the position shown in full lines in Figure 1. Thus, the rear end of the scoop is held in a partially elevated position by the engagement of the laterally extending pins 52 with the stop brackets 53.

As the tractor moves forwardly, the front end of the bucket will dig into and scrape the surface of the earth, which will pile up into the scoop and be confined therein. Rearward movement of the scoop is prevented by the engagement of the stop pins 52 with the stop brackets 53, and upward raising movement of the bucket or scoop is prevented by the rock arms 55, the cranks 57, etc.

After the scoop has received a full load, the operator of the tractor moves the lever 44 so as to bring the movable section of the clutch 42 into operative position, which will wind up the cables 64 on the drums 41. The cables 64 will pull the levers 60 forwardly, and the forward movement of the levers 60 will bring about the rotation of the spur gears 58 through their connection with the sector gears 63. This will operate the cranks 57 in such a manner that the rock arms 55 will be elevated, and the front end of the scoop will be brought into firm contact with the cover 68. At this time, the driver can release the lever 44, and the friction set up between the sections of the clutch brake will be sufficient to hold the scoop in its elevated carrying position.

When the load is to be dumped, the lever 44 is again actuated by the operator of the vehicle, so that the movable clutch section will be held in firm contact with the other clutch section, and the drums 41 will continue to wind up the cables 64 thereon.

Continued forward movement of the levers 60 will rotate the crank-arms 57 substantially in a complete arc of a circle, which will bring the rock arms 55 over the supporting pins 66. As the levers 60 move forward, the chains 65 will tighten and draw up and elevate the rear end of the bucket, as is clearly shown in Figure 2 of the drawings. The load will then gravitate from the bucket, and the front edge of the bucket or scoop will function to spread the load as the tractor and trailer continues its forward movement.

The supporting pins 66 aid in supporting the bucket, and as the protuberances or cams 67 ride over the pins 66 the bucket or scoop will be elevated the desired distance.

When the load has been spread, the tractor and trailer again returns to the scene of working operations, and the lever 44 is again manipulated so that the movable section of the clutch 42 is entirely brought away from the other clutch section. This will release the bucket or scoop 23 from the operating shaft, and the bucket will gravitate to its scraping and digging position, as shown in full lines in Figure 1.

From the foregoing description, it can be seen that I have provided a trailer scoop which has a short turning radius. Thus, the device can be easily manipulated in confined spaces. By my arrangement of levers 60 and drums 41, all cables are advantageously disposed and completely out of the way of the scoop, and the necessity of hydraulic jacks and complicated cable arrangements is eliminated.

Changes in details may be made without departing from the spirit or the scope of my invention, but what I claim as new is:

1. In a trailer scoop, a frame including a pair of side beams, a scoop bucket disposed between said beams movable into a digging position, a load-carrying position, and a load-dumping and spreading position, rock arms pivotally connected to the sides of the bucket at the forward ends thereof, a pair of operating levers rockably mounted on the side beams, sector gears rigidly secured to the side beams, spur gears rotatably mounted on the levers meshing with the sector gears, crank-arms movable with the spur gears pivotally connected with the rock arms, and means for operating the levers.

2. A trailer scoop comprising, a frame including side beams, a scoop bucket disposed between but independent of said side beams, movable rock arms for solely supporting the front end of the scoop, means for actuating the rock arms, means on the scoop engaging the frame for supporting the rear end of the scoop bucket from the frame when the scoop bucket is in its digging position, and means on the frame engaging an intermediate portion of the rock arms for supporting the rock arms from the frame when the scoop bucket is in its dumping position.

3. A trailer scoop comprising, a frame including side beams, a scoop bucket disposed between said side beams, rock arms supporting the front end of the scoop bucket, a rigid cover and abutment plate carried by the frame, means for supporting the rear end of the bucket from the frame when the bucket is in a scraping position, means for actuating the arms for moving the bucket, first, to a carrying position in engagement with the cover and abutment plate and, second, to a further raised position, and means operating in conjunction with the rock levers to swing the bucket on the rock levers to an inclined dumping position, when said bucket is in its further raised position.

4. A trailer scoop comprising, a frame including side beams, a scoop bucket movable between said beams to a scraping position, a load-carrying position, and a load-dumping position, rock arms pivotally secured to the front end of the bucket for supporting the same, levers rockably mounted at their lower ends on the side beams, sector gears secured to the side beams, spur gears rotatably mounted on the levers meshing with the sector gears, cranks movable with the spur gears pivotally connected with the upper ends of the rock arms, means for operating the levers, and flexible members connecting the upper ends of the levers with the rear ends of the bucket.

5. A trailer scoop comprising, a frame including side beams, a scoop bucket movable between said beams to a scraping position, a load-carrying position, and a load-dumping position, rock arms pivotally secured to the front end of the bucket for supporting the same, levers rockably mounted at their lower ends on the side beams, sector gears secured to the side beams, spur gears rotatably mounted on the levers meshing with the sector gears, cranks movable with the spur gears pivotally connected with the upper ends of the rock arms, means for operating the levers, flexible members connecting the upper ends of the levers with the rear ends of the bucket, and positive means for supporting the rock arms from the side beams when the rock arms are in a predetermined position.

RALPH T. OSMAN.